United States Patent
Huang et al.

(10) Patent No.: US 9,371,107 B2
(45) Date of Patent: Jun. 21, 2016

(54) STEPPER

(71) Applicants: Chang Gung University, Taoyuan (TW); Chang Gung Memorial Hospital, Linkou, Taoyuan (TW)

(72) Inventors: Shu-Chun Huang, Taoyuan (TW); May-Kuen Wong, Taoyuan (TW)

(73) Assignees: CHANG GUNG UNIVERSITY, Taoyuan (TW); CHANG GUNG MEMORIAL HOSPITAL, LINKOU, Taoyuan (TW)

( * ) Notice: Subject to any disclaimer, the term of this patent is extended or adjusted under 35 U.S.C. 154(b) by 0 days.

(21) Appl. No.: 14/821,173

(22) Filed: Aug. 7, 2015

(65) Prior Publication Data

US 2016/0052585 A1 Feb. 25, 2016

(30) Foreign Application Priority Data

Aug. 19, 2014 (TW) ............... 103128518 A

(51) Int. Cl.
| | |
|---|---|
| *B62K 5/00* | (2013.01) |
| *B62K 5/08* | (2006.01) |
| *B62M 1/26* | (2013.01) |
| *B62M 9/02* | (2006.01) |
| *B62J 1/00* | (2006.01) |
| *B62K 23/02* | (2006.01) |
| *B62K 5/05* | (2013.01) |

(52) U.S. Cl.
CPC ... *B62K 5/08* (2013.01); *B62J 1/00* (2013.01); *B62K 5/05* (2013.01); *B62K 23/02* (2013.01); *B62M 1/26* (2013.01); *B62M 9/02* (2013.01)

(58) Field of Classification Search
CPC ............ B62K 5/08; B62K 23/02; B62K 5/05; B62J 1/00
See application file for complete search history.

(56) References Cited

U.S. PATENT DOCUMENTS

| 169,774 | A | * | 11/1875 | Bodel et al. | .............. | B62M 1/12 280/233 |
|---|---|---|---|---|---|---|
| 1,255,595 | A | * | 2/1918 | Gerson | .................... | B62K 5/08 280/269 |
| 2,481,683 | A | * | 9/1949 | Polacek | ................... | B62K 5/05 280/256 |
| 4,351,406 | A | * | 9/1982 | Lay | ........................ | A61G 5/045 180/206.5 |
| 4,705,284 | A | * | 11/1987 | Stout | ...................... | A61G 5/025 280/250.1 |
| 4,828,284 | A | * | 5/1989 | Sandgren | ............... | B62K 3/002 280/221 |
| 5,069,469 | A | * | 12/1991 | Rosengrant | ............ | B62K 3/005 280/259 |
| 5,326,121 | A | * | 7/1994 | Fisher | ...................... | B62K 5/00 280/124.103 |
| 5,383,675 | A | * | 1/1995 | Liebert | .................. | B62K 21/00 114/144 R |

(Continued)

*Primary Examiner* — Joseph Rocca
*Assistant Examiner* — Gabriela C Craciun
(74) *Attorney, Agent, or Firm* — Muncy, Geissler, Olds & Lowe, P.C.

(57) ABSTRACT

A stepper comprising: a direction controller having a front wheel set and a steering wheel connected to the front wheel set; a rear wheel transmission having a gear transmission and a rear wheel shaft, the gear transmission having an active gear, a chain and a passive gear, the active gear connected to the passive gear via the chain, the rear wheel shaft having a rear wheel set and connected to the passive gear; a supporting shaft connected to the direction controller and the rear wheel transmission; and a foot-hand swinging set having a pedal and a joystick having a handle, the pedal mounted on two sides of the supporting shaft, one end of the pedal connected to the active gear, the joystick connected to another end of the pedal. The present invention can be propelled by only single leg, and can be rehabilitation and locomotion apparatus.

9 Claims, 7 Drawing Sheets

(56) References Cited

U.S. PATENT DOCUMENTS

| | | | |
|---|---|---|---|
| 5,775,708 A * | 7/1998 | Heath | B62K 21/00 280/224 |
| 5,826,897 A * | 10/1998 | Beard | A61G 5/023 280/217 |
| 6,161,860 A * | 12/2000 | Corneau | A61H 3/04 135/67 |
| 6,352,274 B1 * | 3/2002 | Redman | B62K 3/005 280/248 |
| 7,066,480 B2 * | 6/2006 | Brichet | B62K 3/005 280/233 |
| 7,223,210 B2 * | 5/2007 | Krul | A63B 22/001 280/224 |
| 7,967,313 B1 * | 6/2011 | Eggert | B62K 5/02 280/224 |
| 8,448,969 B2 * | 5/2013 | Heath | B62M 1/12 280/234 |
| 2004/0188977 A1 * | 9/2004 | Jones | B62K 3/005 280/282 |
| 2010/0283216 A1 * | 11/2010 | Kanou | B62K 5/08 280/240 |
| 2011/0233885 A1 * | 9/2011 | McMillan | B62K 3/002 280/89.11 |
| 2014/0346752 A1 * | 11/2014 | Rasmussen | B62M 11/14 280/238 |

\* cited by examiner

STEPPER

CROSS REFERENCE

This non-provisional application claims priority from Taiwan Patent Application NO. 103128518, filed on Aug. 19, 2014, the content thereof is incorporated by reference herein.

FIELD OF THE INVENTION

The present invention relates to an exercise, locomotion, and recreation device, for example, for a person who cannot move easily.

BACKGROUND OF THE INVENTION

Since the mobility of patients is restricted due to paralysis or incoordination, for example, stroke or Parkinsonism, it is difficult for them to partake in aerobic exercise, e.g. brisk walking, jogging, biking, or swimming. Prolonged lack of exercise may lead the patients to suffer from muscular atrophy, cardiopulmonary deconditioning, depressive mood, or high risk of stroke recurrence. Therefore there is a need to develop a new aerobic exercise module suitable for the patients, especially for those with ambulation difficulty resulted from severe paralysis.

Some paralyzed patients can slowly walk with a cane, and others can ambulate using a wheelchair. The wheelchair can go forward or backward using patients' one-hand operation, and can turn left or right using their one-foot operation. Such movements are slow and tend to cause shoulder injury. These operations are not ergonomic and can cause learned non-use in the hemi-paretic limbs.

Therefore, it is desirable to assist paralyzed patients in moving by themselves, and partake in aerobic exercise at the same time.

SUMMARY OF THE INVENTION

An objective of the present invention is to provide a stepper, which comprises: a direction controller, a rear wheel transmission, a supporting shaft, and a foot-hand swinging set. The direction controller has a front wheel set and a steering wheel. The steering wheel is connected to the front wheel set for turning the front wheel set so that the stepper turns. The rear wheel transmission has a gear transmission and a rear wheel shaft. The gear transmission has an active gear, a chain, and a passive gear, and the active gear is connected to the passive gear via the chain for rotating the passive gear when being rotated. The rear wheel shaft has a rear wheel set and is connected to the passive gear for rotating the rear wheel set when the passive gear is rotated. The supporting shaft is connected to the direction controller and the rear wheel transmission for driving rotation of the front wheel set when the rear wheel set is rotated so that the stepper moves. The foot-hand swinging set has a pedal and a joystick. The pedal is mounted on two sides of the supporting shaft, and one end of the pedal is connected to the active gear for rotating the active gear when the pedal is rotated. The joystick has a handle for grasping, and is connected to another end of the pedal for being rotated by the pedal when the pedal is rotated, or for rotating the pedal when being rotated.

DETAILED DESCRIPTION OF THE INVENTION

The detailed description and preferred embodiments of the invention will be set forth in the following content, and provided for people skilled in the art so as to understand the characteristics of the invention.

Figure 1:
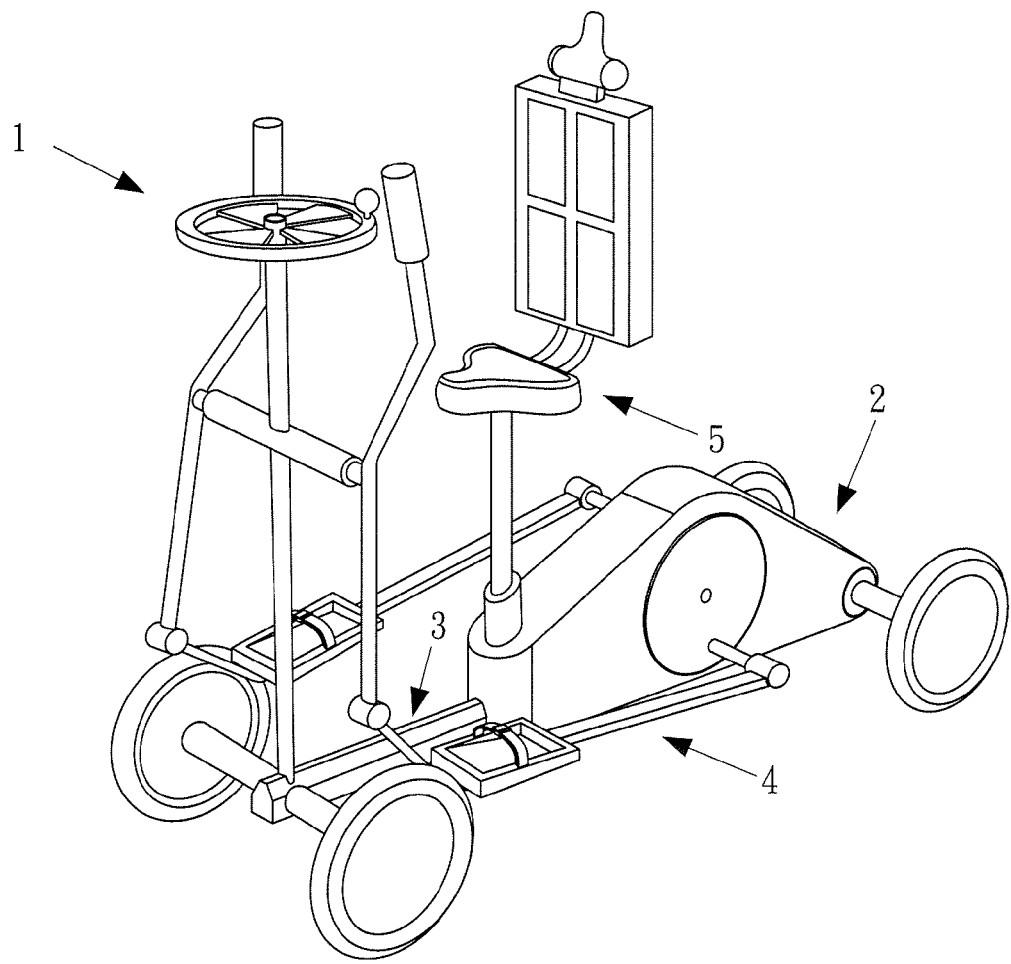
FIG. 1 is a schematic view illustrating a four-wheeled stepper according to an embodiment of the present invention.
Figure 2:
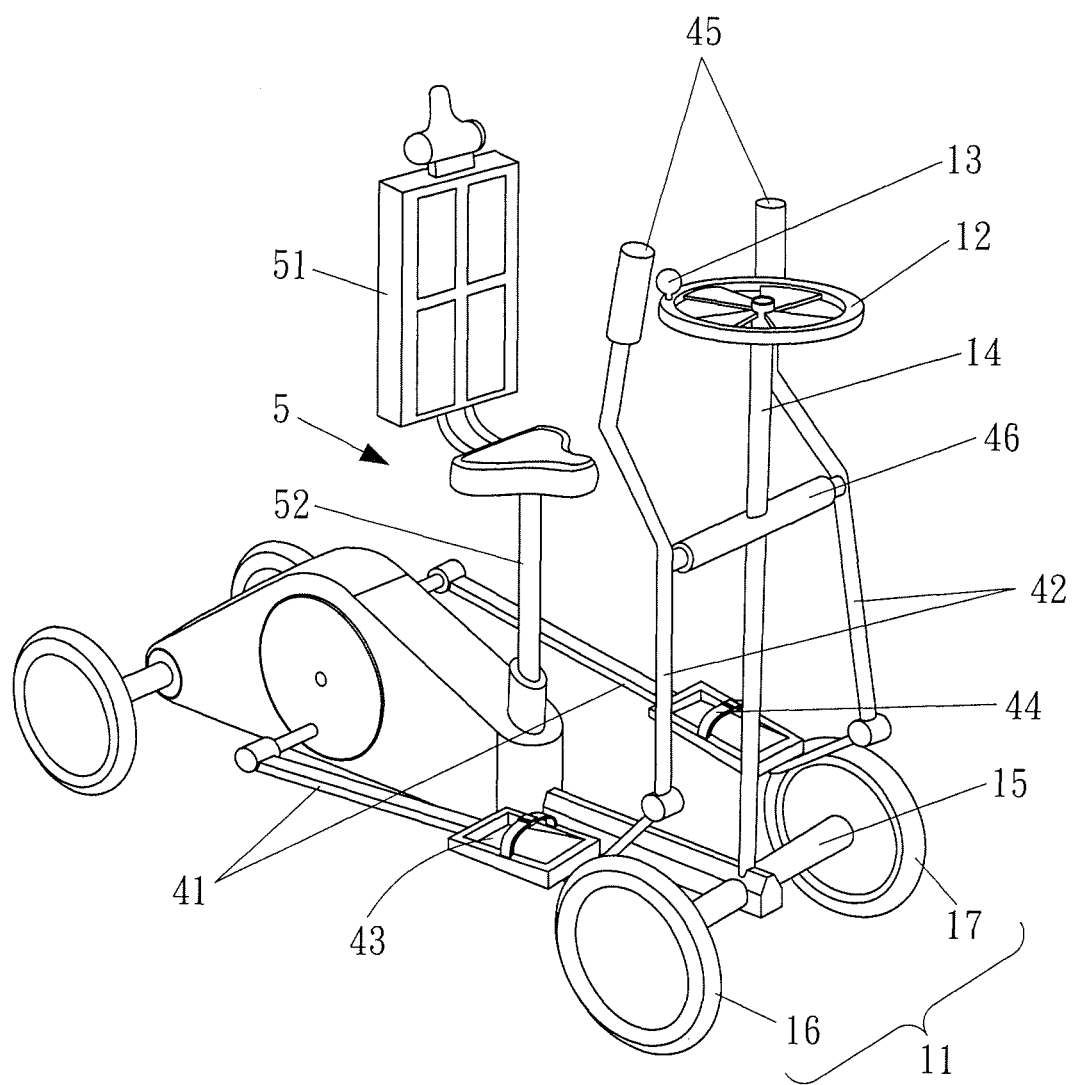
FIG. 2 is a schematic view illustrating the four-wheeled stepper shown in FIG. 1.
Figure 3:
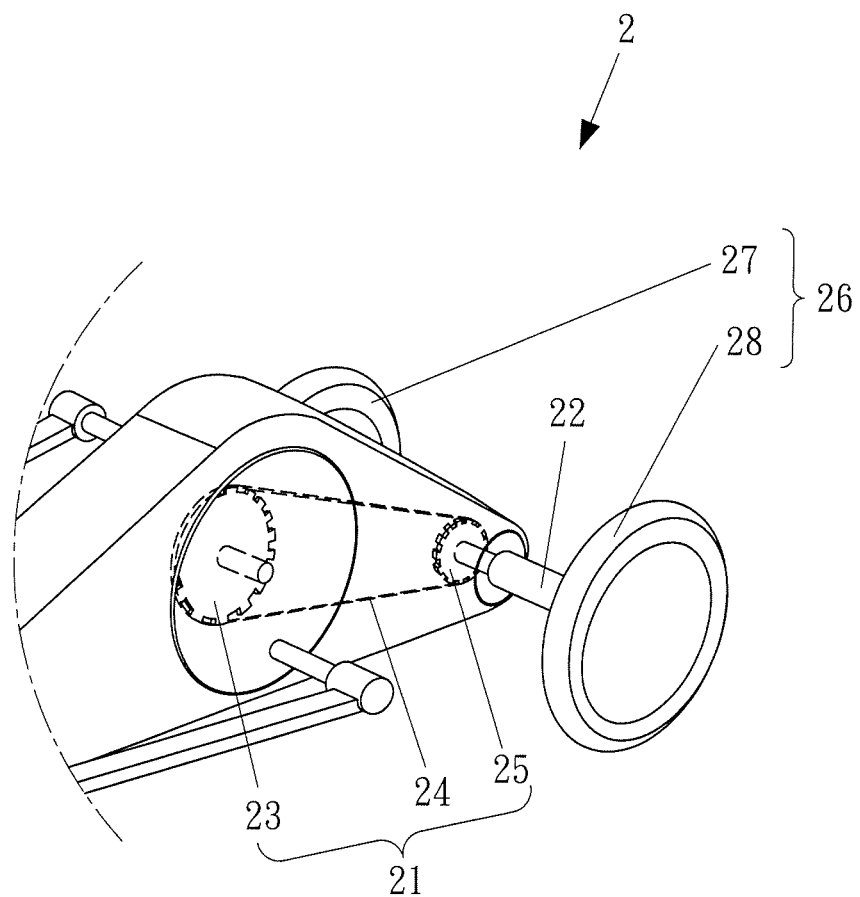
FIG. 3 is a schematic view illustrating the rear wheel transmission of the four-wheeled stepper shown in FIG. 1.

A four-wheeled stepper according to an embodiment of the present invention is depicted in FIGS. 1-3, and comprises a direction controller (1), a rear wheel transmission (2), a supporting shaft (3), a foot-hand swinging set (4), and a seat (5).

The direction controller (1) has a front wheel set (11) and a steering wheel (12) connected to the front wheel set (11). When a user rotates the steering wheel (12) with his/her one hand or two hands, the front wheel set (11) can be driven to turn by the steering wheel (12). In such a way, the four-wheeled stepper turns left or right. Preferably, the steering wheel (12) is mounted with a boss (13). The user can rotate the steering wheel (12) by merely griping the boss (13) with his/her hand(s).

The direction controller (1) further comprises a rotatable shaft (14) connected to the steering wheel (12), and a front wheel shaft (15) connected to the rotatable shaft (14); the front wheel set (11) has a front-right wheel (16) and a front-left wheel (17), and these front wheels (16, 17) are connected to two ends of the front wheel shaft (15). Upon rotation of the steering wheel (12), the rotatable shaft (14) can be driven to rotate by the steering wheel (12). Meanwhile, the front wheel shaft (15) can be driven to turn by the rotatable shaft (14). Also, the two front wheels (16, 17) can be driven to turn by the front wheel shaft (15). In such a way, the four-wheeled stepper turns left or right.

The rear wheel transmission (2) has a gear transmission (21) and a rear wheel shaft (22). The gear transmission (21) has an active gear (23), a chain (24) and a passive gear (25), and the active gear (23) is connected to the passive gear (25) via the chain (24). When the active gear (23) is rotated, the active gear (23) can drive rotation of the chain (24) to rotate the passive gear (25). The rear wheel shaft (22) has a rear wheel set (26) and is connected to the passive gear (25). Upon rotation of the passive gear (25), the passive gear (25) leads the rear wheel shaft (22) to rotation so as to rotate the rear wheel set (26). In the present embodiment, the rear wheel set (26) has a rear-right wheel (27) and a rear-left wheel (28). The two rear wheels (27, 28) are connected to two ends of the rear wheel shaft (22).

The supporting shaft (3) is connected to the direction controller (1) and the rear wheel transmission (2). The supporting shaft (3) can drive rotation of the front wheel set (11) during the rotation of the rear wheel set (26). By the rotation of the front wheel set (11) and the rear wheel set (26), the four-wheeled stepper moves.

The foot-hand swinging set (4) has a pedal (41) and a joystick (42).

The pedal (41) is mounted on two sides of the supporting shaft (3). One end of the pedal (41) is connected to the active gear (23). When the user rotates the pedal (41) with his/her one leg or two legs, the pedal (41) can rotate the active gear (23). Preferably, the pedal (41) is mounted with a recess (43) and a securing strip (44). The recess (43) can accommodate the user's foot, and the securing strip (44) can secure the user's foot, resulting in that the rotation of the pedal (41) is realized with the leg(s). For example, when the user is a patient of single sided paralysis, the user still can rotate the pedal (41) with his/her single functional leg.

The joystick (42) has a handle (45) for grasping. Therefore, the user can securely grip the joystick (42) through the handle (45) with his/her hand(s). The joystick (42) is also connected to another end of the pedal (41). When the user rotates the pedal (41) with his/her leg(s), the joystick (42) can be driven to rotate by the pedal (41). Alternatively, when the user rotates the joystick (42) with his/her hand(s), the pedal (41) can be driven to rotate by the joystick (42). These two ways both allow the four-wheeled stepper to move and activate the use's hand(s) and leg(s).

Preferably, the foot-hand swinging set (4) has a bar (46) connected to the joystick (42) and the rotatable shaft (14), which can support the foot-hand swinging set (4).

Preferably, the handle (45) levels with the steering wheel (12) to facilitate the rotation of the joystick (42) and the steering wheel (12) by the user.

The seat (5) is mounted on the supporting shaft (3) for sitting. Specifically, the user can sit on the seat (5). The seat (5) may be mounted with a seat back (51) to support the user when he/she sits on the seat (5). Furthermore, a telescoping rod (52) may be mounted between the seat (5) and the supporting shaft (3). The telescoping rod (52) is able to be lengthened or shortened so that the distance between the seat (5) and the supporting shaft (3) complies with the user's height. An example of the telescoping rod (52) is, but not limited to, a pneumatic and hydraulic buffer shaft.

Figure 4:
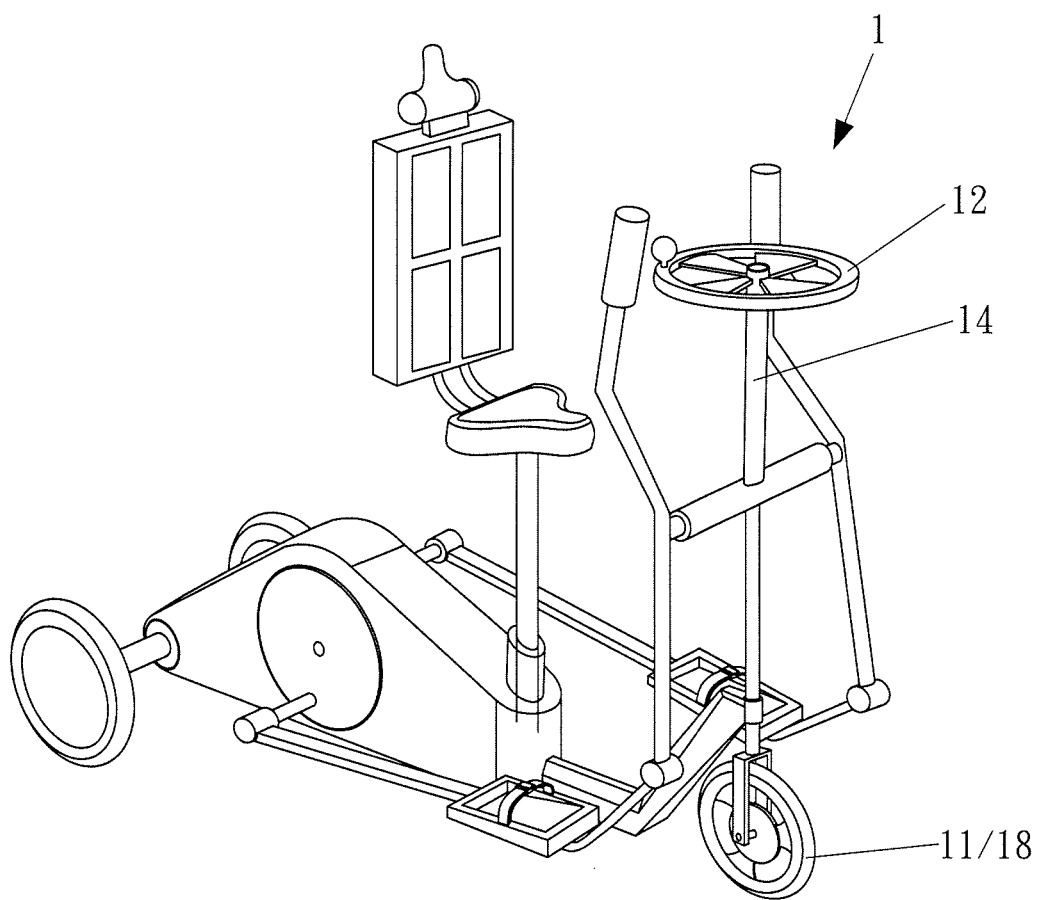
FIG. 4 is a schematic view illustrating a three-wheeled stepper according to an embodiment of the present invention.
Figure 5:
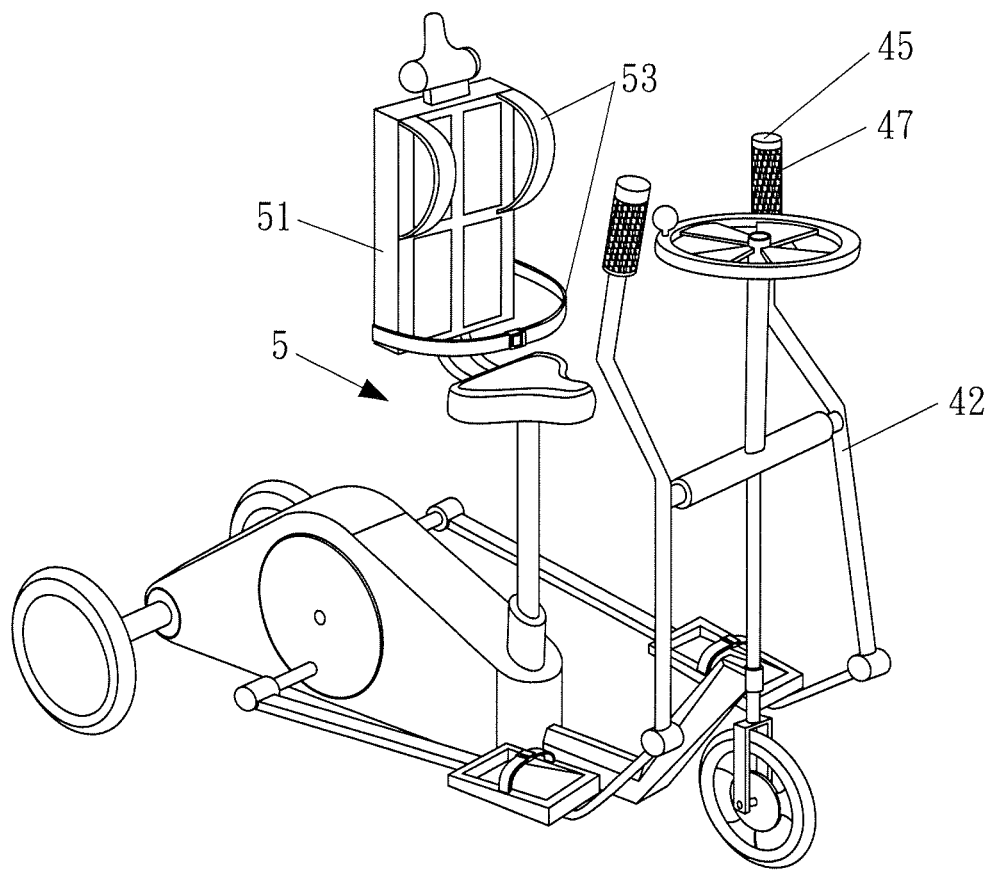
FIG. 5 is a schematic view illustrating the three-wheeled stepper shown in FIG. 4.

A three-wheeled stepper according to an embodiment of the present invention is depicted in FIGS. 4-5 and has features identical to that of the previous embodiment, except for the following features:

The direction controller (1) further comprises a rotatable shaft (14) connected to the steering wheel (12); the front wheel set (11) has a front wheel (18) connected to the rotatable shaft (14). When the user rotates the steering wheel (12), the steering wheel (12) can drive rotation of the rotatable shaft (14), and the rotatable shaft (14) can drive turning of the front wheel (18). In such a way, the three-wheeled stepper turns left or right.

The handle (45) is further mounted with a hook-and-loop fastener (47) for being detachably connected to a glove. Therefore, the user can wear the glove on his/her hand(s), and securely grip the joystick (42) by the connection of the glove with the hook-and-loop fastener (47).

The seat back (51) is further mounted with a safety belt (53), so the user is able to securely sit on the seat (5).

Figure 6:
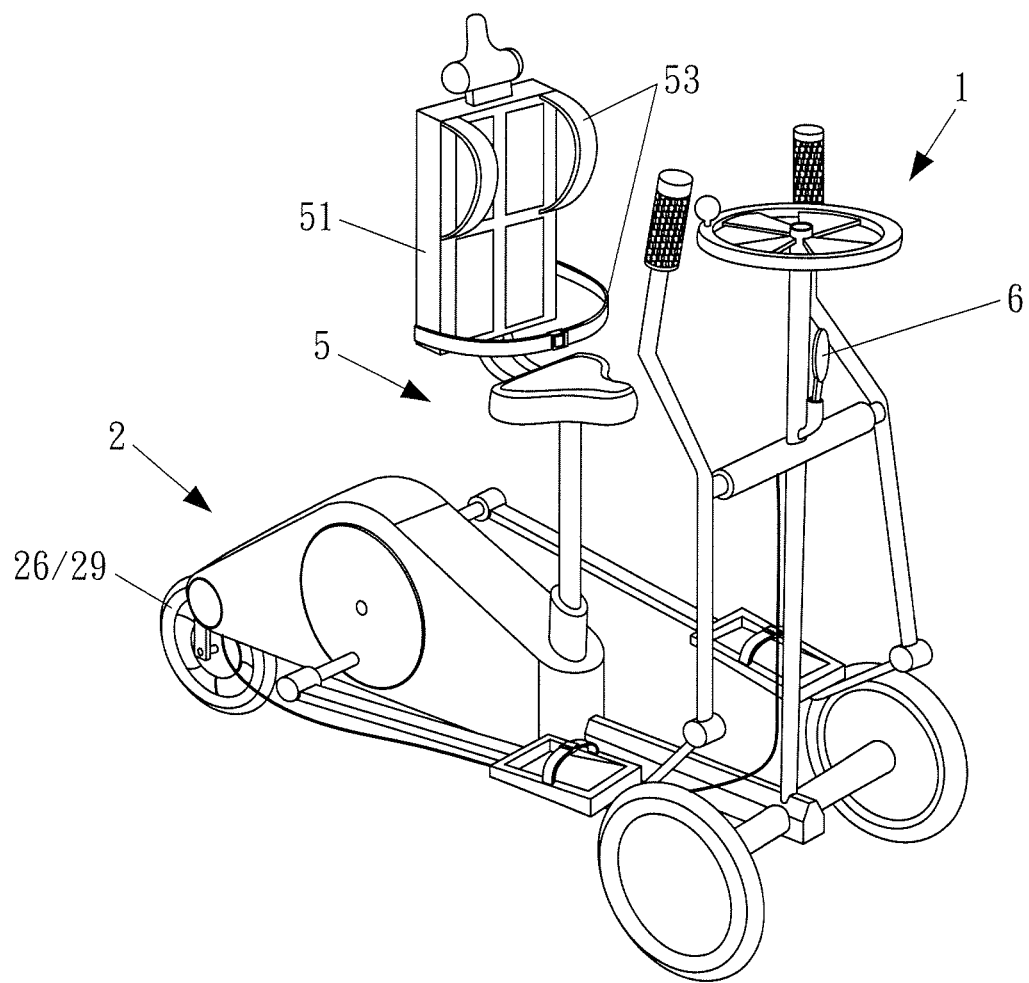
FIG. 6 is a schematic view illustrating a three-wheeled stepper according to an embodiment of the present invention.
Figure 7:
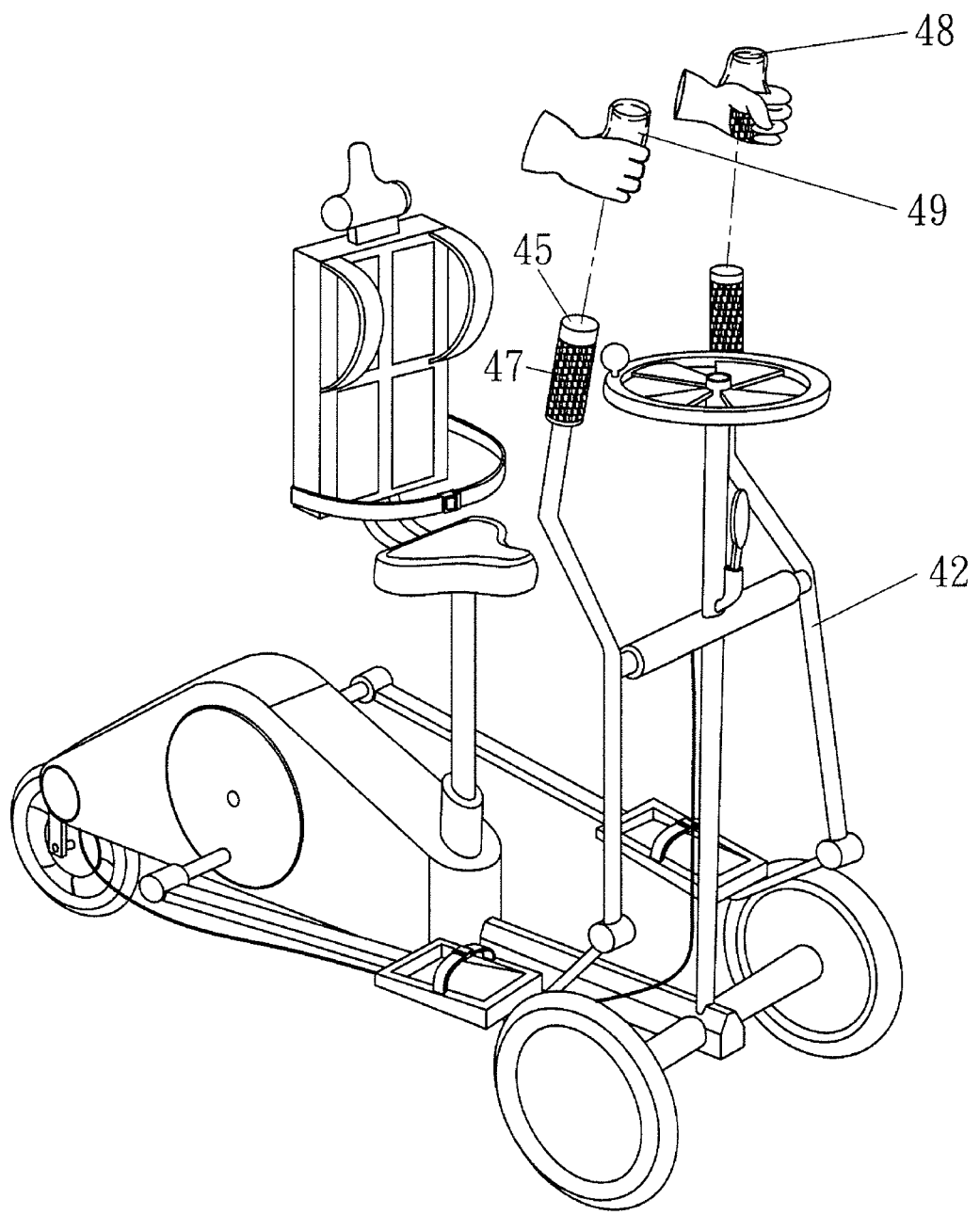
FIG. 7 is a schematic view illustrating the three-wheeled stepper shown in FIG. 6.

A three-wheeled stepper according to an embodiment of the present invention is depicted in FIGS. 6-7 and has features identical to that of the first embodiment, except for the following features:

The rear wheel set (26) has a rear wheel (29).

The handle (45) is further mounted with a hook-and-loop fastener (47) for being detachably connected to a glove (48). A thumb portion and an index finger portion of the glove (48) are connected to form a sleeve (49). When the user wears the glove (48) on his/her hand(s), the handle (45) can be inserted into the sleeve (49) and connected to the hook-and-loop fastener (47). This facilitates the user's joystick (42) gripping. Especially, if the use is a patient of upper limb paralysis, he/she still can securely grip the joystick (42).

The seat back (51) is further mounted with a safety belt (53), so the user is able to securely sit on the seat (5).

The three-wheeled stepper further comprises a brake (6) connected to the direction controller (1) and the rear wheel transmission (2), which can slow down the three-wheeled stepper if necessary.

As described above, when the stepper of the present invention is used, the user's hand(s) can be activated with rotation of the joystick resulted from rotation of the pedal by his/her leg(s), or his/her leg(s) can be activated with rotation of the pedal caused by rotation of the joystick by his/her hand(s). This helps the user imitate walking and allows the stepper to move. As such, the user's interest to partake in exercise rises. Especially, if the user is a paralyzed patient or a child, this increases the former's desire for rehabilitation and the latter's interest in learning to walk.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A stepper for a physically-impaired person comprising:
    a direction controller comprising:
        a front wheel set; and
        a steering wheel connected to the front wheel set for turning the front wheel set so that the stepper turns;
    a rear wheel transmission comprising:
        a gear transmission comprising an active gear, a chain, and a passive gear, the active gear connected to the passive gear via the chain for rotating the passive gear when being rotated; and
        a rear wheel shaft comprising a rear wheel set and connected to the passive gear for rotating the rear wheel set when the passive gear is rotated;
    a supporting shaft connected to the direction controller and the rear wheel transmission for driving rotation of the front wheel set when the rear wheel set is rotated so that the stepper moves; and
    a foot-hand swinging set comprising:
        a pedal mounted on two sides of the supporting shaft, one end of the pedal connected to the active gear for rotating the active gear when the pedal is rotated;
        a joystick having a handle for grasping, the joystick connected to another end of the pedal for being rotated by the pedal when the pedal is rotated, or for rotating the pedal when being rotated; and
        a seat mounted on the supporting shaft and having a seat back, the seat back having a safety belt;
    wherein the pedal has a recess and a securing strip, wherein the direction controller further comprises a rotatable shaft connected to the steering wheel for being rotated by the steering wheel when the steering wheel is rotated; and wherein a bar is connected to the joystick and the rotatable shaft, so as to support the foot-hand swinging set.

2. The stepper as claimed in claim 1, wherein the front wheel set comprises a front wheel connected to the rotatable shaft for being turned by the rotatable shaft when the rotatable shaft is rotated so that the stepper turns; and wherein the rear wheel set has a rear wheel.

3. The stepper as claimed in claim 1, wherein the front wheel set comprises a front wheel connected to the rotatable shaft for being turned by the rotatable shaft when the rotatable shaft is rotated so that the stepper turns; and wherein the rear wheel set comprises a rear-right wheel and a rear-left wheel both connected to two ends of the rear wheel shaft.

4. The stepper as claimed in claim 1, wherein the direction controller further comprises a front wheel shaft connected to the rotatable shaft for being turned by the rotatable shaft when the rotatable shaft is rotated; and the front wheel set comprises a front-right wheel and a front-left wheel, the front wheels connected to two ends of the front wheel shaft for being turned by the front wheel shaft when the front wheel shaft is turned so that the stepper turns; and wherein the rear wheel set has a rear wheel.

5. The stepper as claimed in claim 1, wherein a front wheel shaft is connected to the rotatable shaft for being turned by the rotatable shaft when the rotatable shaft is rotated; and the front wheel set comprises a front-right wheel and a front-left wheel, the front wheels connected to two ends of the front wheel shaft for being turned by the front wheel shaft when the front wheel shaft is turned so that the stepper turns; and wherein the rear wheel set comprises a rear-right wheel and a rear-left wheel both connected to two ends of the rear wheel shaft.

6. The stepper as claimed in claim 1, wherein the handle has a hoop-and-loop fastener for detachable connection to a glove.

7. The stepper as claimed in claim 1, wherein the handle has a hoop-and-loop fastener for detachable connection to a glove, and a thumb portion and an index finger portion of the glove are connected to form a sleeve for inserting the handle thereto and connecting the handle.

8. The stepper as claimed in claim 1, wherein the handle levels with the steering wheel.

9. The stepper as claimed in claim 1, further comprising:
a brake connected to the direction controller and the rear wheel transmission.

\* \* \* \* \*